(12) United States Patent  (10) Patent No.: US 8,834,760 B2
Martin et al.  (45) Date of Patent: Sep. 16, 2014

(54) METHOD AND DEVICE FOR EXTRUSION OF HOLLOW PELLETS

(75) Inventors: J. Wayne Martin, Buchanan, VA (US); Roger Blake Wright, Staunton, VA (US)

(73) Assignee: Gala Industries, Inc., Eagle Rock, VA (US)

( * ) Notice: Subject to any disclaimer, the term of this patent is extended or adjusted under 35 U.S.C. 154(b) by 840 days.

(21) Appl. No.: 12/993,062

(22) PCT Filed: May 15, 2009

(86) PCT No.: PCT/US2009/044220
§ 371 (c)(1),
(2), (4) Date: Dec. 15, 2010

(87) PCT Pub. No.: WO2009/140643
PCT Pub. Date: Nov. 19, 2009

(65) Prior Publication Data
US 2011/0291318 A1  Dec. 1, 2011

Related U.S. Application Data

(60) Provisional application No. 61/053,984, filed on May 16, 2008.

(51) Int. Cl.
*B29C 47/00* (2006.01)
*B29B 9/06* (2006.01)
*B29B 9/00* (2006.01)
*B29C 47/12* (2006.01)
*B30B 11/22* (2006.01)
*B29B 9/12* (2006.01)
*B29D 22/00* (2006.01)
*B29C 47/30* (2006.01)
*B29K 105/00* (2006.01)

(52) U.S. Cl.
CPC ............ *B29B 9/06* (2013.01); *B30B 11/221* (2013.01); *B29C 47/30* (2013.01); *B29C 47/0057* (2013.01); *B29B 9/12* (2013.01); *B29C 47/0023* (2013.01); *B29D 22/00* (2013.01); *B29K 2105/251* (2013.01); *B29C 47/003* (2013.01); *B29C 47/0011* (2013.01)
USPC .......... 264/150; 264/140; 264/141; 264/142; 264/143; 264/172.1; 264/177.13; 264/177.14; 264/177.16; 264/209.8; 425/67; 425/68; 425/69; 425/70; 425/112; 425/306; 425/311; 425/312

(58) Field of Classification Search
None
See application file for complete search history.

(56) References Cited

U.S. PATENT DOCUMENTS 3,269,824 A * 8/1966 Aswell ................................ 71/7
3,587,281 A * 6/1971 Lemelson ........................ 72/265

(Continued)

FOREIGN PATENT DOCUMENTS

CN  201002316 Y  1/2008
DE  3243332  1/1984

(Continued)

OTHER PUBLICATIONS

International Search Report and Written Opinion issued by the Korean Intellectual Property Office dated Dec. 30, 2009 for related PCT Application No. PCT/US2009/044220.

(Continued)

*Primary Examiner* — Jeffrey Wollschlager
(74) *Attorney, Agent, or Firm* — Troutman Sanders LLP; Ryan A. Schneider; Benjamin C. Wiles (57) ABSTRACT

Described herein are extrusion processes to produce hollow pellets. Also disclosed are pelletizer devices that can be used to produce the hollow pellets. The processes and devices make use of an extrusion die having a die orifice and an insert that is placed in the die orifice to produce the hollow pellets.

14 Claims, 7 Drawing Sheets

(56) References Cited

U.S. PATENT DOCUMENTS

| | | | |
|---|---|---|---|
| 3,924,988 A * | 12/1975 | Hodge | 425/461 |
| 4,123,207 A | 10/1978 | Dudley | |
| 4,204,821 A | 5/1980 | Gauchel et al. | |
| 4,251,198 A | 2/1981 | Altenburg | |
| 4,346,053 A * | 8/1982 | Pfeiffer | 264/561 |
| 4,394,339 A * | 7/1983 | Pfeiffer et al. | 264/177.14 |
| 4,500,271 A | 2/1985 | Smith | |
| 4,621,996 A * | 11/1986 | Hundley, III | 425/190 |
| 4,728,176 A | 3/1988 | Tsuboyama et al. | |
| 4,752,205 A | 6/1988 | Moriyama et al. | |
| 4,888,990 A | 12/1989 | Bryan et al. | |
| 5,059,103 A | 10/1991 | Bruckmann et al. | |
| 5,391,694 A * | 2/1995 | Duh et al. | 528/272 |
| 5,403,176 A | 4/1995 | Bruckmann et al. | |
| 5,624,688 A | 4/1997 | Adams et al. | |
| 6,332,765 B1 | 12/2001 | Spelleken | |
| 6,470,726 B1 * | 10/2002 | Murata et al. | 72/260 |
| 6,551,087 B1 | 4/2003 | Martin | |
| 6,586,031 B1 | 7/2003 | Kelly | |
| 6,793,473 B1 | 9/2004 | Fridley | |
| 6,824,371 B2 | 11/2004 | Smit | |
| 6,925,741 B2 | 8/2005 | Eloo et al. | |
| 7,033,152 B2 | 4/2006 | Eloo et al. | |
| 7,172,397 B2 | 2/2007 | Fridley | |
| 2005/0220920 A1 | 10/2005 | Fridley | |
| 2006/0165834 A1 | 7/2006 | Fridley | |

FOREIGN PATENT DOCUMENTS

| | | |
|---|---|---|
| DE | 8701490.4 | 7/1987 |
| DE | 3702841 | 8/1987 |
| DE | 19642389 | 4/1997 |
| DE | 19651354 | 6/1997 |
| DE | 29624638 U1 | 4/2006 |
| EP | 1582327 | 10/2005 |
| EP | 1218156 | 2/2007 |
| JP | 10191948 | 7/1998 |
| WO | 2006081140 | 8/2006 |
| WO | 2006087179 | 8/2006 |
| WO | 2007064580 | 6/2007 |

OTHER PUBLICATIONS

Notification of First Office Action dated Oct. 10, 2012, issued by the State Intellectual Property Office of the P.R. China for related Chinese Patent Application No. 2009801163944.

* cited by examiner

METHOD AND DEVICE FOR EXTRUSION OF HOLLOW PELLETS

CROSS-REFERENCE TO RELATED APPLICATION

The present application claims the benefit of International Patent Application Serial Number PCT/US2009/044220, filed 15 May 2009, which claims the benefit of U.S. Provisional Patent Application Ser. No. 61/053,984, filed 16 May 2008, both of which are entitled "Method and Device for Extrusion of Hollow Pellets," and are hereby incorporated by reference in their entirety as if fully set forth below.

BACKGROUND OF THE INVENTION

1. Field of the Invention

The present invention relates generally to an extrusion process to produce hollow pellets, wherein an insert is placed in the die holes of an extrusion die, about which is extruded the molten material to form those hollow pellets.

2. Description of the Prior Art

Pelletization equipment and its use following extrusion processing has been introduced and/or utilized in applications by the assignee for many years as is exemplified by prior art disclosures including U.S. Pat. Nos. 4,123,207; 4,251,198; 4,500,271; 4,621,996; 4,728,176; 4,888,990; 5,059,103; 5,403,176; 5,624,688; 6,332,765; 6,551,087; 6,793,473; 6,824,371; 6,925,741; 7,033,152; 7,172,397; US Patent Application Publication Nos. 20050220920, 20060165834; German Patents and Applications including DE 32 43 332, DE 37 02 841, DE 87 01 490, DE 196 42 389, DE 196 51 354, DE 296 24 638; World Patent Application Publications WO2006/087179, WO2006/081140, WO2006/087179, and WO2007/064580; and European Patents including EP 1 218 156 and EP 1 582 327. These patents and applications are all owned by the assignee and are included herein by way of reference in their entirety.

These disclosures remain silent as to the use of inserts in the pelletization process. More specifically, these disclosures remain silent regarding the use of inserts in the extrusion die, wherein molten material flows about the extrusion die and insert such that a hollow pellet is generated.

The various embodiments of the present invention provide a cost effective method to prepare reproducible hollow pellets by use of a multiplicity of inserts in an equivalent multiplicity of die orifices through an extrusion die plate.

BRIEF SUMMARY OF THE INVENTION

Briefly described, in preferred form, the various embodiments of the present invention provide a process to extrude hollow pellets by use of at least one insert through the at least one die orifice in an extrusion die. Molten material passes to, and through, the die orifice containing the insert. The molten material is extruded, preferably with pressure, to give a hollow pellet on cooling, such that the hollow cavity formed can be at least one of continuously hollow throughout the pellet, completely and circumferentially enclosed within the pellet, and many combinations therebetween such that the enclosed hollow cavity is at least perforatedly connected in at least one locus to the outside of the pellet.

The hollow pellets are reproducible in structure and can be of any molten material, preferably polymeric, and any geometry both from the pellet shape as well as the hollow cavity shape. The hollow pellet obtained is dependent upon but not limited to the extrusion viscosity, die swell, material composition, temperature of the melt, rate of cooling, degree of crystallization, melt index, cutting speed of the pelletization process, and the like.

It is therefore an aspect of the present invention to provide an inexpensive and cost effective method to produce relatively consistent and reproducible hollow pellets utilizing at least one insert in the at least one orifice of an extrusion die about which the molten material is extruded such that the pellet shape, pellet diameter, cavity shape, cavity diameter, and penetration of that cavity or the lack thereof in and/or through the pellet is controlled.

In certain embodiments, an extrusion process for producing hollow pellets includes extruding molten material through an extrusion die comprising a die orifice and an insert disposed in the die orifice, and cooling the extruded molten material effective to produce a pellet having a hollow cavity. The extrusion die can be a single-body extrusion die, a removable extrusion die assembly, or other structure. In some cases, the extruding can be implemented using pressure.

The insert can include a mandrel, a plurality of fins, and a plurality of fins tapers.

The hollow cavity of the pellet can penetrate a first surface of the pellet and continuously extend through a second surface of the pellet. Alternatively, the hollow cavity can be encapsulated completely within the pellet. It is also possible for the hollow cavity to penetrate a first surface of the pellet and extend inwardly to an interior portion of a body of the pellet. If a pellet has more than one hollow cavity, any one or more of these types of hollow cavities can be incorporated into the pellet.

The molten material can be chosen from a polyolefin, a cross-linkable polyolefin, vinyl polymer, substituted vinyl polymer, polyester, polyamide, polyether, polythioether, polyurethane, polyimide, polycarbonate, polysulfide, polysulfone, wax, a copolymer thereof, or a formulation comprising at least two of the foregoing.

Another extrusion process for producing hollow pellets involves feeding a molten material into a pelletizer, extruding the molten material through an extrusion die of the pelletizer using pressure, and cooling the extruded molten material effective to produce a pellet having a hollow cavity. The pelletizer can be an underwater pelletizer.

The extrusion die of the pelletizer can have a die orifice and an insert disposed in the die orifice, where the insert comprises a mandrel, a plurality of fins, and a plurality of fins tapers. In some cases, the extrusion die includes a plurality of die orifices through which the molten material is extruded, such that each die orifice of the plurality of die orifices has an insert.

A pelletizer, according to some embodiments, can include an inlet for receiving a molten material, a die orifice that is downstream of the inlet and is for extruding the molten material, an insert disposed in the die orifice, where the insert comprises a mandrel, a plurality of fins, and a plurality of fins tapers, and an outlet for transporting the extruded molten material from the pelletizer. The pelletizer can be an underwater pelletizer. In some cases, the insert has at least four fins disposed about the mandrel such each of the at least four fins is disposed less than or equal to about 90 degrees apart from an adjacent fin. The extruded molten material includes a pellet having a hollow cavity.

BRIEF DESCRIPTION OF THE DRAWINGS

FIG. 5a is a horizontal cross-sectional view of the insert in the die hole at line a.

FIG. 6 are illustrations of various pellet geometries in top view, cross-section, and side view, including FIG. 6a that illustrates a top view of a cylindrical pellet through which the hollow completely penetrates.

FIG. 6b illustrates a cross-sectional view of the hollow approximately cylindrical pellet from FIG. 6a.

DETAILED DESCRIPTION

Although only preferred embodiments of the invention are explained in detail, it is to be understood that the invention is not limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity. It is to be understood that each specific term includes all technical equivalents that operate in a similar manner to accomplish a similar purpose.

Figure 1:
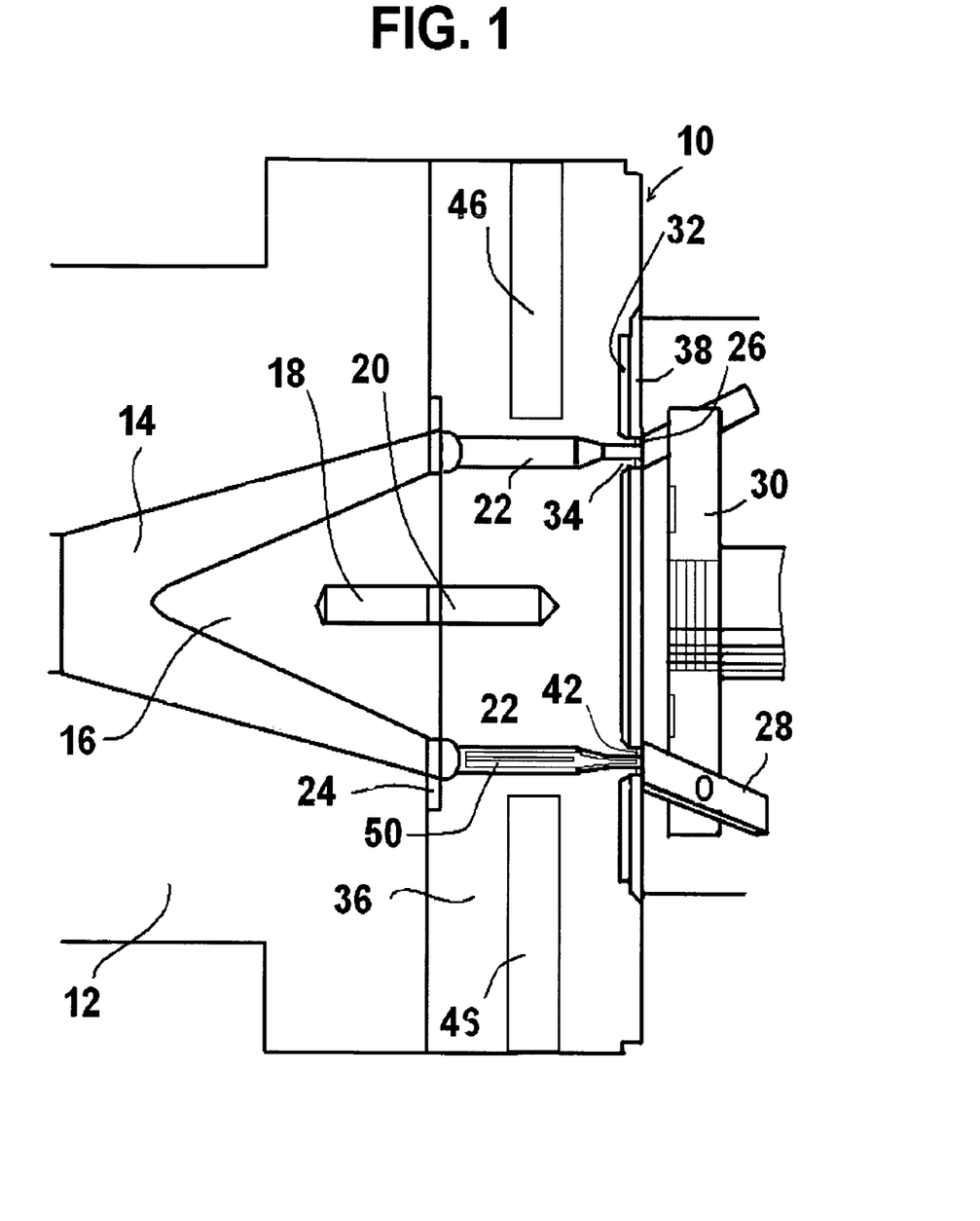
FIG. 1 is a schematic vertical sectional view of one embodiment of the single-body extrusion die assembly of the present invention in which the perforated is of single-body construction.

Referring to the drawings, FIG. 1 illustrates one embodiment of the present invention associated with components of a pelletizer. The pelletizer includes an inlet housing 12 from a melting and/or mixing apparatus (not shown). The inlet housing 12 includes a passageway 14 for molten material or other extrudate (hereinafter collectively referred to as "process melt") that can include organic materials, oligomers, polymers, waxes, and combinations thereof without intending to be limited. Nose cone 16 directs the process melt to the upstream side of the single-body extrusion die 10 to which it is attachedly connected by a threaded rod (not shown). The threaded rod is screw threaded at one end into threaded bore 18 of nose cone 16 and at its distal end into threaded bore 20 of single-body extrusion die 10. Alternately, the nose cone 16 can be continuous with the single-body extrusion die 10 and need not be attachedly connected as herein described.

The single-body extrusion die 10 contains at least one, and preferably a multiplicity of, die holes 22 concentrically arranged singly or in multiples thereof in at least one ring that extend from the upstream face 24 to the downstream face 26 of single-body extrusion die 10. A plurality of knife blade assemblies 28 mounted on a rotatably driven cutter hub 30 in a cutting chamber (not shown) cut the extruded, cooled, and at least partially solidified process melt into pellets. The pellets thusly formed are transported mechanically, pneumatically, hydraulically, and in combinations thereof to downstream processing.

Areas of the downstream face 26 optionally can be cut out to provide at least one annular recess or cavity 32 peripherally adjacent to the die holes 22 such that the die holes 22 are contained in protrusions 34 that are continuous with the base plate 36 of single-body extrusion die 10. Within die holes 22, with or without protrusions 34, are an equivalent number of inserts 50 detailed hereinbelow. Annular cover plate 38 overlays the annular recess or cavity 32 and is attachedly connected to base plate 36 and protrusions 34 by brazing, welding, or similar technique known to those skilled in the art. The cover plate 38 can be at least one of an abrasion and corrosion resistant metal, preferably nickel steel, a hard face material, preferably tungsten carbide, and many combinations thereof. Similarly, attachment of the cover plate 38 to the base plate 36 and/or protrusions 34 is preferably achieved by welding, brazing, and the like. The surface of the cover plate 38 and thus the downstream face 26 of single-body extrusion die 10 can optionally be coated with a chemical, abrasion, corrosion, and wear resistant coating as is known to those skilled in the art.

Figure 2:
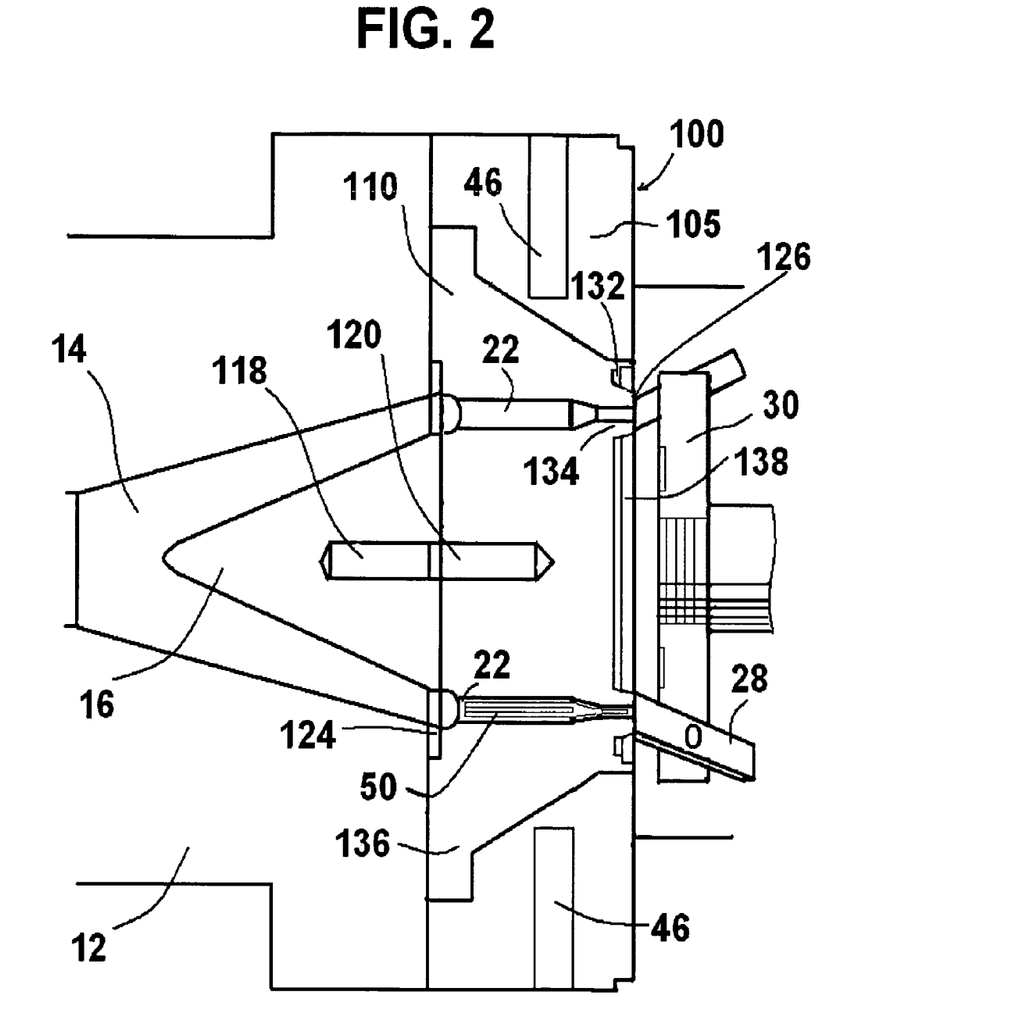
FIG. 2 is a schematic vertical sectional view of the removable insert extrusion die assembly of the present invention in which the perforated is of removable center construction.

FIG. 2 illustrates a removable insert extrusion die assembly 100 in a second embodiment of the present invention. Removable insert extrusion die assembly 100 is comprised of base plate 105 and removable insert 110. Similarly to FIG. 1, the removable insert extrusion die assembly 100 is attachedly connected to an inlet housing 12 from a melting and/or mixing apparatus (not shown). The inlet housing 12 includes a passageway 14 for process melt as heretofore described. Nose cone 16 directs the process melt to the upstream side of the removable insert 110 to which it is attachedly connected by threaded rod (not shown). The threaded rod is screw threaded at one end into threaded bore 118 of nose cone 16 and at its distal end into threaded bore 120 of removable insert 110.

The removable insert 110 contains at least one and preferably a multiplicity of die holes 22 concentrically arranged singly or in multiples thereof in at least one ring that extend from the upstream face 124 to the downstream face 126 of removable insert 110. A plurality of knife blade assemblies 28 mounted on a rotatably driven cutter hub 30 in a cutting chamber (not shown) cut the extruded, cooled, and at least partially solidified process melt into pellets. The pellets thusly formed are transported mechanically, pneumatically, hydraulically, and in combinations thereof to downstream processing as before.

Areas of the downstream face 126 optionally can be cut out to provide at least one annular recess or cavity 132 peripherally adjacent to the die holes 22 such that the die holes 22 are contained in protrusions 134 that are continuous with the removable center base plate 136 of removable insert 110. Within die holes 22, with or without protrusions 134, are an equivalent number of inserts 50 detailed hereinbelow. Annular cover plate 138 overlays the annular recess or cavity 132 and is attachedly connected to removable center base plate 136 and protrusions 134 by brazing, welding, or similar technique known to those skilled in the art. The cover plate 138 can be at least one of an abrasion and corrosion resistant metal, preferably nickel steel, a hard face material, preferably tungsten carbide, and many combinations thereof. Similarly, attachment of the cover plate 138 to the removable center base plate 136 and/or protrusions 134 is preferably achieved by welding, brazing, and the like. The surface of the cover plate 138 and thus the downstream face 126 of removable insert 110 can optionally be coated with a chemical, abrasion, corrosion, and wear resistant coating as is known to those skilled in the art.

Heating and/or cooling processes can be provided by electrical resistance, induction, steam or heat transfer fluid as has been conventionally disclosed for the single-body extrusion die 10 as well as the removable insert extrusion die assembly 100. The removable insert 110 and the base plate 105, FIG. 2, alternatively can be heated separately by similar or differing mechanisms. Preferably heating elements 46 are inserted into the single-body extrusion die 10 or the removable insert extrusion die assembly 100 as illustrated in FIGS. 1 and 2, respectively. Other designs as are known to those skilled in the art are included herein by way of reference without intending to be limited.

Figure 3:
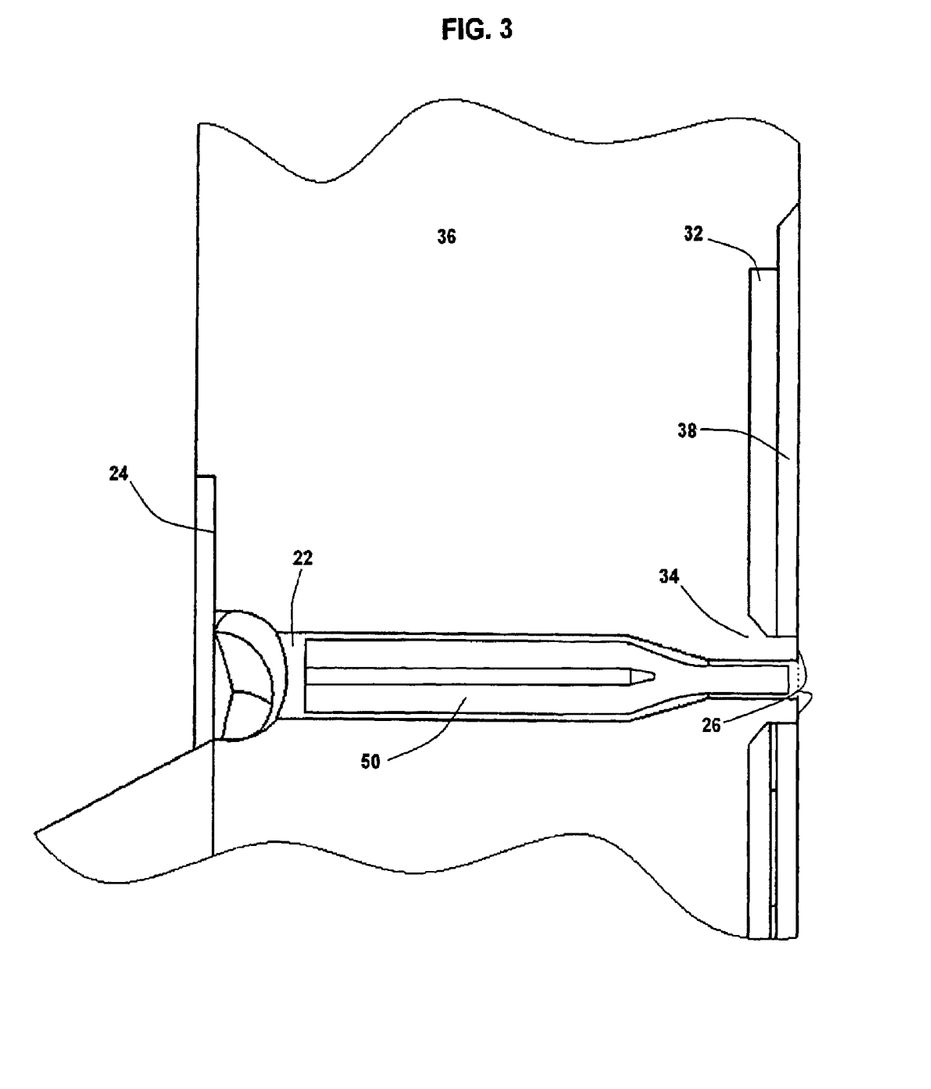
FIG. 3 is a schematic vertical sectional view illustrating the association of the die orifice and insert.

Turning now to FIG. 3 for the single-body extrusion die 10, the insert 50 is illustrated within die hole 22 that extends from upstream face 24 into and through optional protrusion 34 in base plate 36 to the downstream face 26 of cover plate 38. Optional annular recess or cavity 32 is also shown for purposes of clarification. An analogous assembly follows for removable insert 110 and is not shown.

Figure 4:
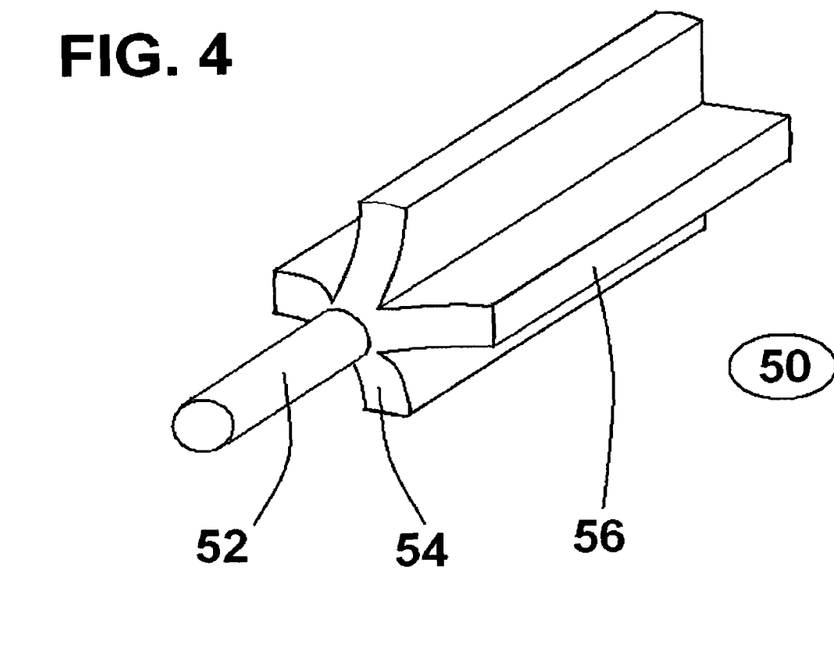
FIG. 4 is a schematic view of the insert.

FIG. 4 illustrates the details of construction for insert 50 which comprises a mandrel 52, a multiplicity of insert fin tapers 54, and a multiplicity of fins 56. The insert 50 can be made of any abrasion-resistant material and is preferably metal. The metal can be aluminum, brass, bronze, copper, steel, tool steel, carbon steel, vanadium steel, stainless steel, nickel steel, nickel, and the like without intending to be limited. More preferably the metal is a good heat conductor including brass, bronze, and copper. Without intending to be bound by any theory, it is believed that the thermally conductive metals maintain uniformity of temperature in the process melt propagating into and through the die hole 22, FIGS. 1, 2, and 3. This is effective in minimizing loss of heat and/or variation in temperature as the material flows in the multiplicity of pathways formed by the multiplicity of fins 56.

The dimensions of the insert 50 must be such that it does not exceed the dimensions of the die hole 22 at process temperature and must take into consideration the differential expansion wherein the metal of the insert 50 differs from that of the base plate 36, FIG. 1, or removable insert 110, FIG. 2. The fins 56 not only form a multiplicity of flow pathways for the process melt but further serve to maintain the position of insert 50 in die hole 22. The minimum number of fins is at least two (2) and preferably at least three (3). More preferably there are four (4) or more fins 52 on insert 50. The multiplicity of fins 56 can be oriented at any angle relative to the adjacent fins to form pathways through which flows the polymer melt. Preferably the fins are 180° apart or less. More preferably the fins are 120° or less apart. Most preferably the fins are 90° or less apart.

Figure 5:
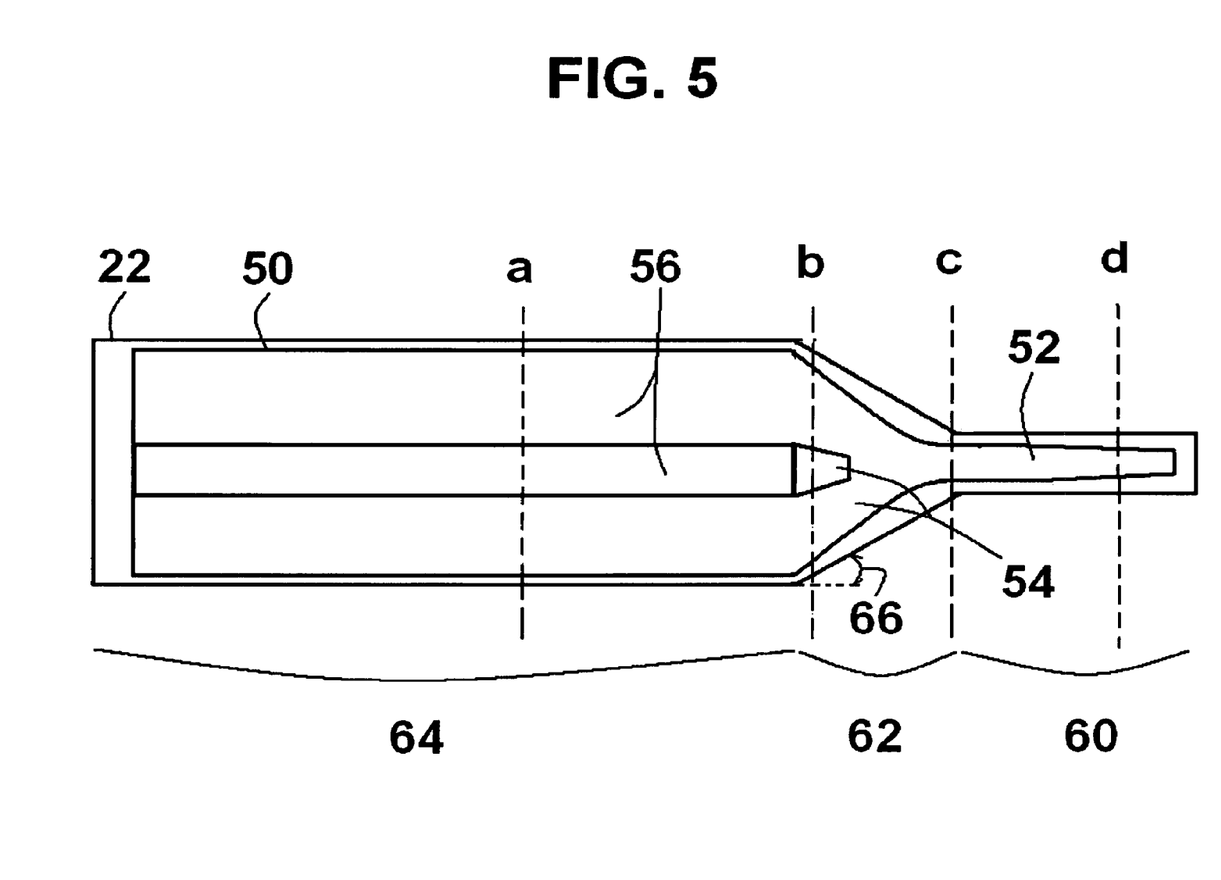
FIG. 5 is a cross-sectional view of the insert in the die hole.

FIG. 5 shows the insert 50 within die hole 22 such that mandrel 52 is significantly contained within die land 60, insert fin tapers 54 approximately correspond dimensionally to die hole taper 62, and fins 56 are approximately contained within the pre-land tube 64. The length of die land 60 typically ranges from at least approximately 0.38 millimeters (approximately 0.015 inch) to approximately 31.75 millimeters (approximately 1.25 inches) and is preferably at least approximately 0.64 millimeters (approximately 0.025 inch) to approximately 25 millimeters (approximately 1.00 inch).

The mandrel 52 within die land 60 is preferably less than the length of the die land 60 and most preferably is at least approximately 0.50 millimeters (approximately 0.025 inch) less than the length of the die land such that the tip of the mandrel is very slightly recessed from the downstream face 26 of the die, FIG. 1, or downstream face 126, FIG. 2. The die land 60 and/or mandrel 52 can be cylindrical or tapered and can be round, oval, rectangular, and the like in geometry. Similarly, the die land 60 and mandrel 52 can be of similar or different geometry. The insert 50 can be press fit and preferably is slide fit into die hole 22.

The insert fin tapers 54 are similar in angularity, at angle 66, to the die hole taper 62 that can range from 0° to 90° as measured from the perpendicular cylinder imposed on the diameter of the pre-land tube 64 at the juncture with the die hole taper 62. Preferably angle 66 ranges from 15° to 45° as described herein. The insert fin tapers 54 can be the same contour as, or different than, that of the die hole taper 62 and dimensionally must taper from the diameter of the fins 56 to the diameter of the mandrel 52. Similarly the fins 56 can be similar to the geometry, cylindrical or tapered and combinations thereof for example, of the pre-land tube 64 or can be different in geometry. Preferably the pre-land tube 64 and the fins 56 are cylindrical. The length of the fins 56 can be the same as the length of the pre-land tube 64 and is preferably less than the length of the pre-land tube 64. More preferably, the length of the fins is at least approximately 0.50 millimeters (approximately 0.020 inch) less than the length of the pre-land tube 64 such that the fins do not protrude outside the length of the pre-land tube 64.

Figure 5A:
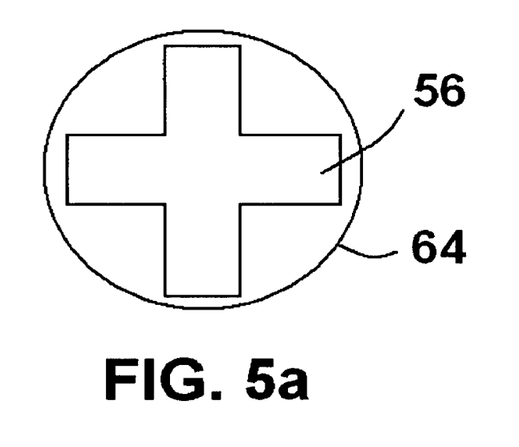
Figure 5B:
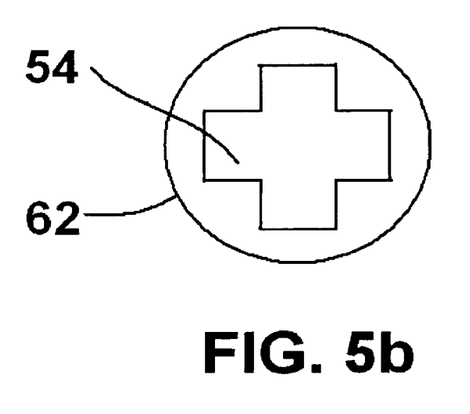
FIG. 5b is a horizontal cross-sectional view of the insert in the die hole at line b.
Figure 5C:
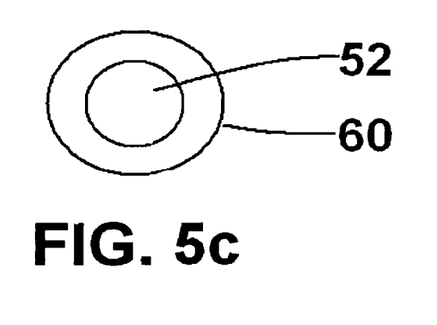
FIG. 5c is a horizontal cross-sectional view of the insert in the die hole at line c.
Figure 5D:
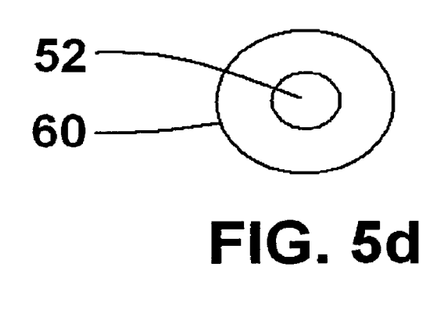
FIG. 5d is a horizontal cross-sectional view of the insert in the die hole at line d.

FIG. 5a illustrates an exemplary cross-sectional design of the fins 56 in pre-land tube 64 at line a. FIG. 5b illustrates an exemplary cross-section design of the insert fin tapers 54 in the die hole taper 62 at line b. FIG. 5c illustrates an exemplary cross-sectional design of the mandrel 52 at the attachment point to the insert fin tapers 54 in die land 60 at line c. FIG. 5d illustrates an optional decreasingly tapered mandrel 52 in die land 60 at line d.

FIG. 6 illustrates the various geometries of the hollow pellets formed in accordance with the present invention. FIG. 6a illustrates a top view of a cylindrical pellet through which the hollow cavity completely penetrates. FIG. 6b illustrates a cross-sectional view of the hollow, approximately-cylindrical pellet from FIG. 6a; and FIG. 6c illustrates a side view of the same pellet. FIG. 6d illustrates a top view of an approximately-round pellet with FIG. 6e illustrating the cross-section through that pellet. FIG. 6f illustrates a top view of an approximately-rectangular pellet with FIG. 6g illustrating a cross-sectional view through that pellet, showing a round, hollow cavity within that rectangular pellet. FIG. 6h illustrates a top view of an approximately round pellet with FIG. 6i illustrating a cross-sectional view through that pellet, showing a cavity with perforations into, and through, the pellet wall. It is understood by those skilled in the art that many pellet shapes and cavity shapes can be achieved by methodologies of the present invention without intending to be limited.

Figure 6A:
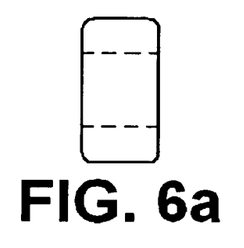
Figure 6B:
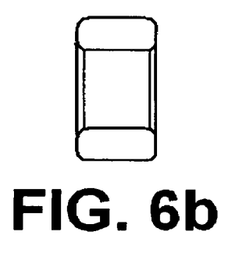
Figure 6C:
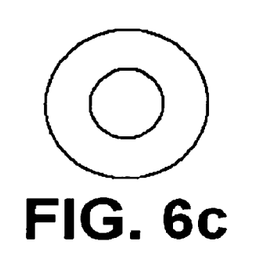
FIG. 6c illustrates a side view of the hollow approximately cylindrical pellet from FIG. 6a FIG. 6d illustrates a top view of an approximately round pellet.
Figure 6D:
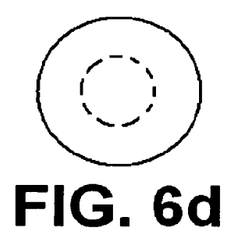
Figure 6E:
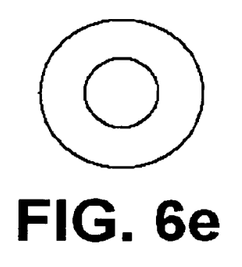
FIG. 6e illustrates the cross-section through the round pellet in FIG. 6d.
Figure 6F:
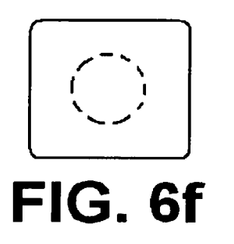
FIG. 6f illustrates a top view of an approximately rectangular pellet.
Figure 6G:
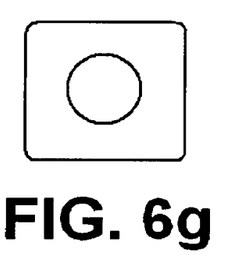
FIG. 6g illustrates a cross-sectional view through the pellet in FIG. 6f showing a round hollow or cavity within that rectangular pellet.
Figure 6H:
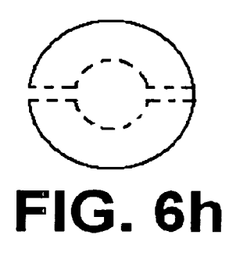
FIG. 6h illustrates a top view of an approximately round pellet.
Figure 6I:
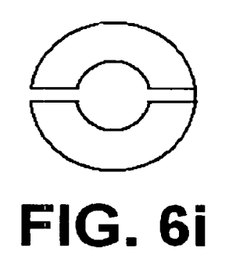
FIG. 6i illustrates a cross-sectional view through the pellet in FIG. 6h wherein a cavity has perforations into and through the pellet wall.

Hollow pellet formation is significantly controlled by the melt rheology and particularly the melt viscosity. Fractional melt materials typically form collar or donut-shaped pellets as illustrated in FIGS. 6a, b, and c described hereinabove. As the melt viscosity decreases and thus the melt flow index increases, it was found that more closure of the pellet was achievable to form a completely enclosed cavity as illustrated in FIGS. 6d, e, f, and g. As melt viscosity continues to drop, and thus melt flow index increases, less completely enclosed cavities were generated, perforations were introduced, and eventually the cavities were found to collapse or partially collapse leading to irregular cavity geometry.

Additionally, such factors as chemical composition, melting point range, and crystallinity are important as these affect the fluidity and temperature of the process melt. Crystallization is typically exothermic and thus adds to the melt process temperature thus lowering the viscosity. The narrower the melting point range the less cooling necessary to significantly increase the solidification and thus the more challenging to form a completely enclosed cavity as compared with a collar or donut-shaped pellet through which the cavity completely penetrates. The polarity, branching, and hydrophobic/hydrophilic interactions of polymers influence the properties in the melt phase as well as the processes leading to solidification. The ability of a material to swell on exiting the die is also an important factor in assessing the closure of the pellet as well as the necessary difference in diameter of the mandrel 52 and die land 60, FIG. 5 to achieve a pellet of a desired diameter containing a cavity of a particular diameter. As the melt viscosity decreases the control of these variables decreases and the temperature influences of crystallization, if present, increases.

The moisture uptake was evaluated as a means of elucidating possible entrapment of moisture wherein pelletization was done in the preferred underwater pelletizing. It was anticipated that moisture would be proportionately high wherein entrapment of the transport fluid, preferably water, occurred in the hollow cavities generated. It was surprisingly found that moisture contents were significantly lower than expected after taking into account the difference in mass of a comparable diameter solid pellet to the reduced mass of the hollow pellet and even more surprising that moisture reduction increased as the polarity of the material increased. For example, both polyethylene and polypropylene hollow pellets were found to have comparable moisture content with solid pellets of comparable diameter whereas ethyl vinyl acetate hollow pellets were found to have approximately one-half to two-thirds the moisture of the solid pellet.

Examples of materials for use in making hollow pellets according to the instant invention include but are not limited to polyolefins, polyethylene, polypropylene, cross-linkable polyolefins, vinyl polymers and substituted vinyl polymers including aliphatic and aromatic, polyesters, polyamides, polyethers and polythioethers, polyurethanes, polyimides, polycarbonates, polysulfides, polysulfones, waxes, and copolymers and formulations thereof.

As was anticipated, back-pressure on the extrusion process increases with the use of the inserts and was found to be alleviated by at least one of increasing the number of holes through the die, increasing the temperature of the process melt, and increasing the temperature of the die. These factors, as is understood by one skilled in the art, are not surprising consequences.

What is claimed is:

1. An extrusion process for producing hollow pellets, the process comprising:
    extruding molten material through an extrusion die comprising a die orifice and an insert disposed in the die orifice, wherein the insert comprises a mandrel and three or more distinct fins extending a length of the insert, the fins maintaining the position of the insert in the die orifice, and wherein at least one of the three or more distinct fins of the insert is tapered; and
    cooling the extruded molten material effective to produce a pellet having a hollow cavity.

2. The process of claim 1, wherein the hollow cavity penetrates a first surface of the pellet and continuously extends through a second surface of the pellet.

3. The process of claim 1, wherein the hollow cavity is completely encapsulated within the pellet.

4. The process of claim 1, wherein the hollow cavity penetrates a first surface of the pellet and extends inwardly to an interior portion of a body of the pellet.

5. The process of claim 1, wherein the extruding comprises pressure extruding.

6. The process of claim 1, wherein the molten material comprises a polyolefin, a cross-linkable polyolefin, vinyl polymer, substituted vinyl polymer, polyester, polyamide, polyether, polythioether, polyurethane, polyimide, polycarbonate, polysulfide, polysulfone, wax, a copolymer thereof, or a formulation comprising at least two of the foregoing.

7. The process of claim 1, wherein the extrusion die is a single-body extrusion die or a removable extrusion die assembly.

8. The process of claim 1, wherein each of the three or more distinct fins are disposed about 180° or less apart from an adjacent fin about the mandrel.

9. The process of claim 1, wherein the three or more distinct fins are at least partially on the mandrel.

10. An extrusion process for producing hollow pellets, the process comprising:
    feeding a molten material into a pelletizer;
    extruding the molten material through an extrusion die of the pelletizer using pressure, wherein the extrusion die comprises a die orifice and an insert disposed in the die orifice, wherein the insert comprises a mandrel and three or more distinct fins extending a length of the insert, the fins maintaining the position of the insert in the die orifice, wherein at least one of the three or more distinct fins is tapered; and
    cooling the extruded molten material effective to produce a pellet having a hollow cavity, wherein the hollow cavity penetrates a first surface of the pellet and continuously extends through a second surface of the pellet, is completely encapsulated within the pellet, or penetrates the first surface of the pellet and extends inwardly to an interior portion of a body of the pellet.

11. The process of claim 10, wherein the extrusion die is a single-body extrusion die or a removable extrusion die assembly.

12. The process of claim 10, wherein the extrusion die comprises a plurality of die orifices through which the molten material is extruded, wherein each die orifice of the plurality of die orifices comprises the insert.

13. The process of claim 10, wherein the pelletizer is an underwater pelletizer.

14. The process of claim 10, wherein the three or more distinct fins are at least partially on the mandrel.

* * * * *